US012139670B1

(12) United States Patent
Yoshimura

(10) Patent No.: US 12,139,670 B1
(45) Date of Patent: Nov. 12, 2024

(54) WASTE PLASTIC OILIFICATION REDUCTION SYSTEM

(71) Applicant: YPM-USA CO., LTD., Wilmington, DE (US)

(72) Inventor: Takeki Yoshimura, Nagano (JP)

(73) Assignee: YPM-USA CO., LTD., Wilmington, DE (US)

(*) Notice: Subject to any disclaimer, the term of this patent is extended or adjusted under 35 U.S.C. 154(b) by 0 days.

(21) Appl. No.: 18/028,621

(22) PCT Filed: Oct. 17, 2022

(86) PCT No.: PCT/JP2022/038560
§ 371 (c)(1),
(2) Date: Mar. 27, 2023

(87) PCT Pub. No.: WO2023/105928
PCT Pub. Date: Jun. 15, 2023

(30) Foreign Application Priority Data

Dec. 10, 2021 (JP) ................................. 2021-200724

(51) Int. Cl.
*C10B 57/02* (2006.01)
*B01J 6/00* (2006.01)
(Continued)

(52) U.S. Cl.
CPC ............... *C10B 57/02* (2013.01); *B01J 6/008* (2013.01); *C10B 19/00* (2013.01); *C10B 43/14* (2013.01); *C10B 53/07* (2013.01)

(58) Field of Classification Search
CPC ......... C10B 57/02; C10B 19/00; C10B 43/14; C10B 53/07; B01J 6/008
See application file for complete search history.

(56) References Cited

U.S. PATENT DOCUMENTS

| 5,608,136 A | 3/1997 | Maezawa et al. |
| 2007/0187224 A1 | 8/2007 | Yoshimura |

FOREIGN PATENT DOCUMENTS

| EP | 1726634 A1 * | 11/2006 | ............. C08J 11/00 |
| JP | 7-82569 A | 3/1995 | |

(Continued)

*Primary Examiner* — Randy Boyer
*Assistant Examiner* — Juan C Valencia
(74) *Attorney, Agent, or Firm* — Birch, Stewart, Kolasch & Birch, LLP

(57) ABSTRACT

A waste plastic oilification reduction system includes: a main condensation process unit including a main condensing section that has a main condensation tank to which decomposition gas in a main pyrolysis process unit is supplied and a cooling section that cools the main condensation tank, and is configured to condense the decomposition gas to produce recycled oil; a sub-pyrolysis process unit having a sub-pyrolysis tank to which a residual gas component remaining in the main condensation tank is supplied and a heating section that heats the sub-pyrolysis tank, and being configured to heat the residual gas component to produce re-decomposition gas; and a sub-condensation process unit including a sub-condensing section that has a sub-condensation tank to which the re-decomposition gas produced by the sub-pyrolysis process unit is supplied and a cooling section that cools the sub-condensation tank, and is configured to condense the re-decomposition gas to produce the recycled oil.

6 Claims, 6 Drawing Sheets

(51) Int. Cl.
    *C10B 19/00*     (2006.01)
    *C10B 43/14*     (2006.01)
    *C10B 53/07*     (2006.01)

(56) References Cited

FOREIGN PATENT DOCUMENTS

| | | |
|---|---|---|
| JP | 2003-98489 A | 4/2003 |
| JP | 2035-200538 A | 7/2005 |
| WO | WO 2019/224985 A1 | 11/2019 |
| WO | WO-2023087075 A1 * | 5/2023 ........... B01D 53/002 |

* cited by examiner

WASTE PLASTIC OILIFICATION REDUCTION SYSTEM

TECHNICAL FIELD

The present invention relates to a waste plastic oilification reduction system that is suitable for use in recycling waste plastics.

BACKGROUND ART

A waste plastic oilification reduction device disclosed in PTL1 is known as a conventional oilification reduction system that reduces waste plastics (polymer wastes) to recycled oil equivalent to heavy oil A after heating and pyrolyzing them.

The oilification reduction system disclosed in PTL1 is intended to eliminate problems such as the tendency of clogging of foreign matter in a heat exchange pipe provided in a condenser, a reduction in heat exchange efficiency and heat exchange capacity, and a degradation in the quality of recycled oil. Specifically, this system is an oilification reduction device that is configured to produce recycled oil by heating and pyrolyzing waste plastics and condensing produced decomposition gas. In this regard, the system is provided with a preprocess unit, a pyrolysis process unit, a condensation process unit, and an oil storage section. The preprocess unit plasticizes and discharges the waste plastics. The pyrolysis process unit has a pyrolysis tank in which the plasticized waste plastic fed from the preprocess unit is housed, and a heating section that heats the pyrolysis tank. The pyrolysis process unit produces decomposition gas by pyrolyzing the waste plastics. The condensation process unit includes a condensing section. The condensing section has a condensation tank and a cooling section. In the condensation tank, a front tank portion and a rear tank portion are formed by providing therein a partition wall having its upper part open. To the front tank portion, the decomposition gas produced in the pyrolysis process unit is supplied. The cooling section cools the condensation tank. The condensing section produces recycled oil by condensing the decomposition gas supplied to the front tank portion. The storage unit stores the recycled oil supplied thereto from the rear tank portion.

PRIOR ART PUBLICATIONS

Patent Literature

Patent Document 1: WO2019/224985

DISCLOSURE OF THE INVENTION

Problem Solved by the Invention

However, the conventional waste plastic oilification reduction device described above also has the following problems to be solved.

In other words, waste plastics are heated and pyrolyzed in the pyrolysis tank to generate decomposition gas, which is condensed to recycled oil. In this case, most of the decomposition gas becomes recycled oil, but part of the decomposition gas (evaporation gas) remains inside the condensation tank. This remaining decomposition gas is processed through an auxiliary condenser and a discharge system, so that it still remains as undecomposed plastic inside the condensation tank or inside the discharge system including the auxiliary condenser.

Such remaining undecomposed plastic is not recycled as recycled oil and thus reduces the recycling efficiency when carrying out oilification reduction. Ultimately, this leads to a decrease in the amount of production of the recycled oil and an increase in the amount of re-wastes. In addition, since the residual undecomposed plastic must be removed periodically, there are still problems to be further improved, such as an increase in the labor and time required for maintenance and cleaning, and causes of the occurrence of the malfunction and troubles.

An object of the present invention is to provide a waste plastic oilification reduction system that solves the problems present in such background technologies.

Means for Solving the Problem

To solve the above-mentioned problems, the present invention is characterized by providing a waste plastic oilification reduction system 1 that produces recycled oil by pyrolyzing waste plastic Rr through heating and condensing produced decomposition gas Gr, the system including: a preprocess unit 2 that plasticizes and discharges the waste plastic Rr: a main pyrolysis process unit 3 having a main pyrolysis tank 4 in which the plasticized waste plastic Rm from the preprocess unit 2 is housed and a heating section 5 that heats the main pyrolysis tank 4 and being configured to pyrolyze the waste plastic Rm to produce the decomposition gas Gr: a main condensation process unit 6 including a main condensing section 9 that has a main condensation tank 7 to which the decomposition gas Gr produced in the main pyrolysis process unit 3 is supplied and a cooling section 8 that cools the main condensation tank 7, and is configured to condense the decomposition gas Gr to produce recycled oil Ro: a sub-pyrolysis process unit 101 having a sub-pyrolysis tank 102 to which a residual gas component Grm remaining in the main condensation tank 7 is supplied and a heating section 103 that heats the sub-pyrolysis tank 102, and being configured to heat the residual gas component Grm to produce re-decomposition gas Grs: a sub-condensation process unit 104 including a sub-condensing section 107 that has a sub-condensation tank 105 to which the re-decomposition gas Grs produced in the sub-pyrolysis process unit 101 is supplied, and a cooling section 106 that cools the sub-condensation tank 105, and is configured to condense the re-decomposition gas Grs to produce recycled oil Ro: and an oil storage section 10 that stores the recycled oil Ro supplied from the main condensing section 9 and the recycled oil Ro supplied from the sub-condensing section 107.

In this case, according to a preferred aspect of the present invention, the sub-pyrolysis process unit 101 is desirably provided with a pre-cooling section 108 that gelatinizes the residual gas component Grm by cooling when the residual gas component Grm remaining in the main condensation tank 7 is supplied to the sub-pyrolysis tank 102. Meanwhile, the preprocess unit 2 can use an extruder 19 with a screw 19s built therein to rotate inside a heating cylinder 19c. Note that when configuring the main pyrolysis process unit 3, it can be configured by providing the main pyrolysis tank 4 with the coil 5c disposed around its outer periphery and also providing the heating section 5 that inductively heats the main pyrolysis tank 4 by application of a high-frequency current to the coil 5c. Further, when configuring the sub-pyrolysis process unit 101, it can be configured by including the sub-pyrolysis tank 102 with a coil 103c disposed around its outer periphery and also providing the heating section 103 that inductively heats the sub-pyrolysis tank 102 by application of a high-frequency current to the coil 103c. The main condensation process unit 6 can be configured by providing the main condensing section 9 that has the main condensation tank 7 and the cooling section 8 that cools the main condensation tank 7. The main condensation tank 7 has a front tank portion 7f and a rear tank portion 7r by providing therein a partition wall 7w with its upper portion 7u open, and the decomposition gas Gr produced in the main pyrolysis process unit 3 is supplied to this front tank portion 7f. The main condensing section 9 produces recycled oil Ro by condensing the decomposition gas Gr supplied to the front tank portion 7f.

Advantageous Effects of Invention

With such a configuration, the waste plastic oilification reduction system 1 according to the present invention has the following remarkable effects.

(1) The oilification reduction system 1 further includes: the sub-pyrolysis process unit 101 having the sub-pyrolysis tank 102 to which the residual gas component Grm remaining in the main condensation tank 7 is supplied and the heating section 103 that heats the sub-pyrolysis tank 102, and being configured to heat the residual gas component Grm to produce the re-decomposition gas Grs: and the sub-condensation process unit 104 including the sub-condensing section 107 that has the sub-condensation tank 105 to which the re-decomposition gas Grs produced in the sub-pyrolysis process unit 101 is supplied and the cooling section 106 that cools the sub-condensation tank 105, and is configured to condense the re-decomposition gas Grs to produce recycled oil Ro. With this configuration, the remaining residual gas component Grm can be effectively reused as the recycled oil Ro. This can further enhance the recycling efficiency when performing oilification reduction, achieving an increase in the produced amount of the recycled oil Ro and a reduction of the amount of re-wastes, while reducing the labor and time required for maintenance and cleaning, and also improving the adverse effects that tend to cause malfunctions and troubles.

(2) According to a preferred aspect, when configuring the sub-pyrolysis process unit 101, a gelatinized undecomposed plastic can be obtained by providing the pre-cooling section 108 that is configured to gelatinize the residual gas component Grm by cooling while the residual gas component Grm remaining in the main condensation tank 7 is supplied to the sub-pyrolysis tank 102. Thus, the sub-pyrolysis tank 102 to which the gelatinized undecomposed plastic is supplied can perform pyrolysis quickly to efficiently produce good re-decomposition gas Grs and further recycled oil Ro.

(3) According to another preferred aspect, by using as the preprocess unit 2, the extruder 19 with the screw 19s built therein to rotate inside the heating cylinder 19c, the waste plastic Rr can be plasticized in the process stage of the preprocess unit 2. Thus, the next pyrolysis process in the pyrolysis process unit 3, i.e., the pyrolysis process that produces decomposition gas Gr, can be performed more efficiently and effectively while contributing to ensuring good and stable quality of the recycled oil Ro.

(4) According to another aspect, when configuring the main pyrolysis process unit 3, the main pyrolysis tank 4 with the coil 5c disposed around its outer periphery is provided, and the heating section 5 is provided to inductively heat the main pyrolysis tank 4 by application of a high-frequency current to the coil 5c, whereby the main pyrolysis tank 4 can be inductively heated by the coil 5c. Thus, the heating section 5 in the main pyrolysis tank 4, which does not discharge carbon dioxide, can be constructed, contributing to making the entire pyrolysis process unit 3 smaller and more compact.

(5) According to another preferred aspect, when configuring the sub-pyrolysis process unit 101, the sub-pyrolysis tank 102 with the coil 103c disposed around its outer periphery is included, and the heating section 103 is provided to inductively heat the sub-pyrolysis tank 102 by application of the high-frequency current to the coil 103c, whereby the sub-pyrolysis tank 102 can be inductively heated by the coil 103c. Thus, the heating section 103 in the sub-pyrolysis tank 102, which does not discharge carbon dioxide, can be constructed, contributing to making the entire sub-pyrolysis process unit 101 smaller and more compact.

(6) According to another preferred aspect, when configuring the main condensation process unit 6, the main condensing section 9 is configured to have the main condensation tank 7 and the cooling section 8 that cools the main condensation tank 7, wherein the main condensation tank 7 has the front tank portion 7f and the rear tank portion 7r formed by providing therein the partition wall 7w with its upper portion 7u open, and the decomposition gas Gr produced in the main pyrolysis process unit 3 is supplied to this front tank portion 7f, and the main condensing section 9 produces recycled oil Ro by condensing the decomposition gas Gr supplied to the front tank portion 7f. With this configuration, since the partition wall 7w having the upper portion 7u open allows foreign matter to settle out as it is in the front tank portion 7f, the supernatant recycled oil Ro with no or little foreign matter can be obtained in the rear tank portion 7r. In addition, the basic shape of the condensation tank 7 becomes a simple tank structure, enabling easy and quick maintenance and cleaning or the like of the tank 7 for removal of foreign matter.

DESCRIPTION OF REFERENCE NUMERALS

1: Oilification reduction system, 2: Preprocess unit, 3: Main pyrolysis process unit, 4: Main pyrolysis tank, 5:

Heating section, 5c: Coil, 6: Main condensation process unit, 7: Main condensation tank, 7u: upper portion, 7w: Partition wall, 7f: Front tank portion, 7r: Rear tank portion, 8: cooling section, 9: Main condensing section, 10: Oil storage section, 19: Extruder, 19s: Screw, 19c: Heating cylinder, 101: Sub-pyrolysis process unit, 102: Sub-pyrolysis tank, 103: Heating section, 103c: Coil, 104: Sub-condensation process unit, 105: Sub-condensation tank, 106: cooling section, 107: Sub-condensing section, 108: Pre-cooling section, Gr: Decomposition gas, Grs: Re-decomposition gas, Rr: Waste plastic, Rm: Plasticized waste plastic, Ro: Recycled oil, Grm: Residual gas component

BEST MODE FOR CARRYING OUT THE INVENTION

Next, the best embodiments of the present invention are listed and described in detail based on the drawings.

First, the configuration of a waste plastic oilification reduction system 1 according to this embodiment will be specifically described with reference to FIGS. 1 to 7.

Figure 1:
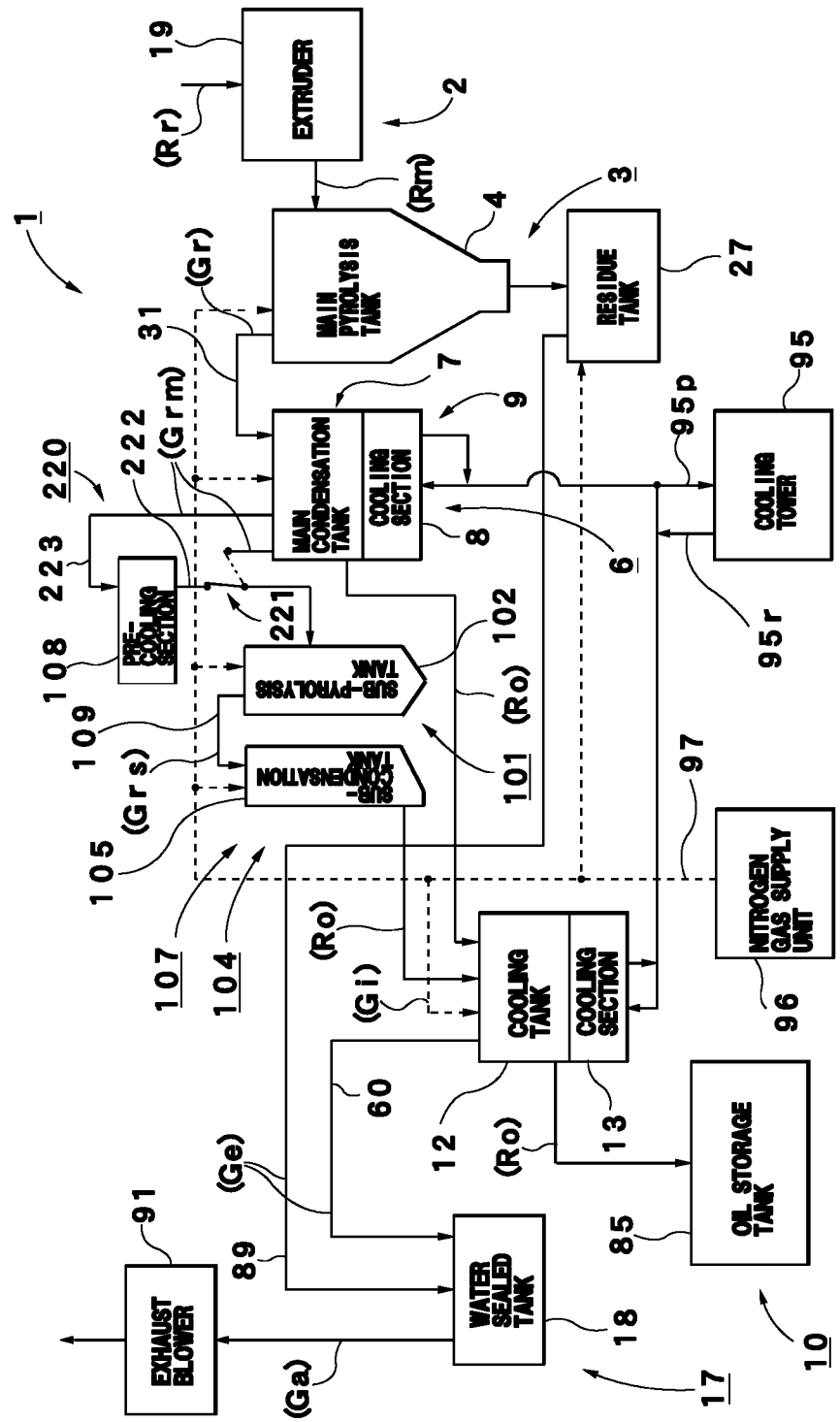
FIG. 1 is a block system diagram of the entire oilification reduction system according to a preferred embodiment of the present invention.

FIG. 1 shows the entire configuration (overall system) of the oilification reduction system 1. The oilification reduction system 1 is broadly divided into a preprocess unit 2, a main pyrolysis process unit 3, a main condensation process unit 6, a sub-pyrolysis process unit 101, a sub-condensation process unit 104, and an oil storage section 10, which are the main components of the oilification reduction system 1.

Figure 2:
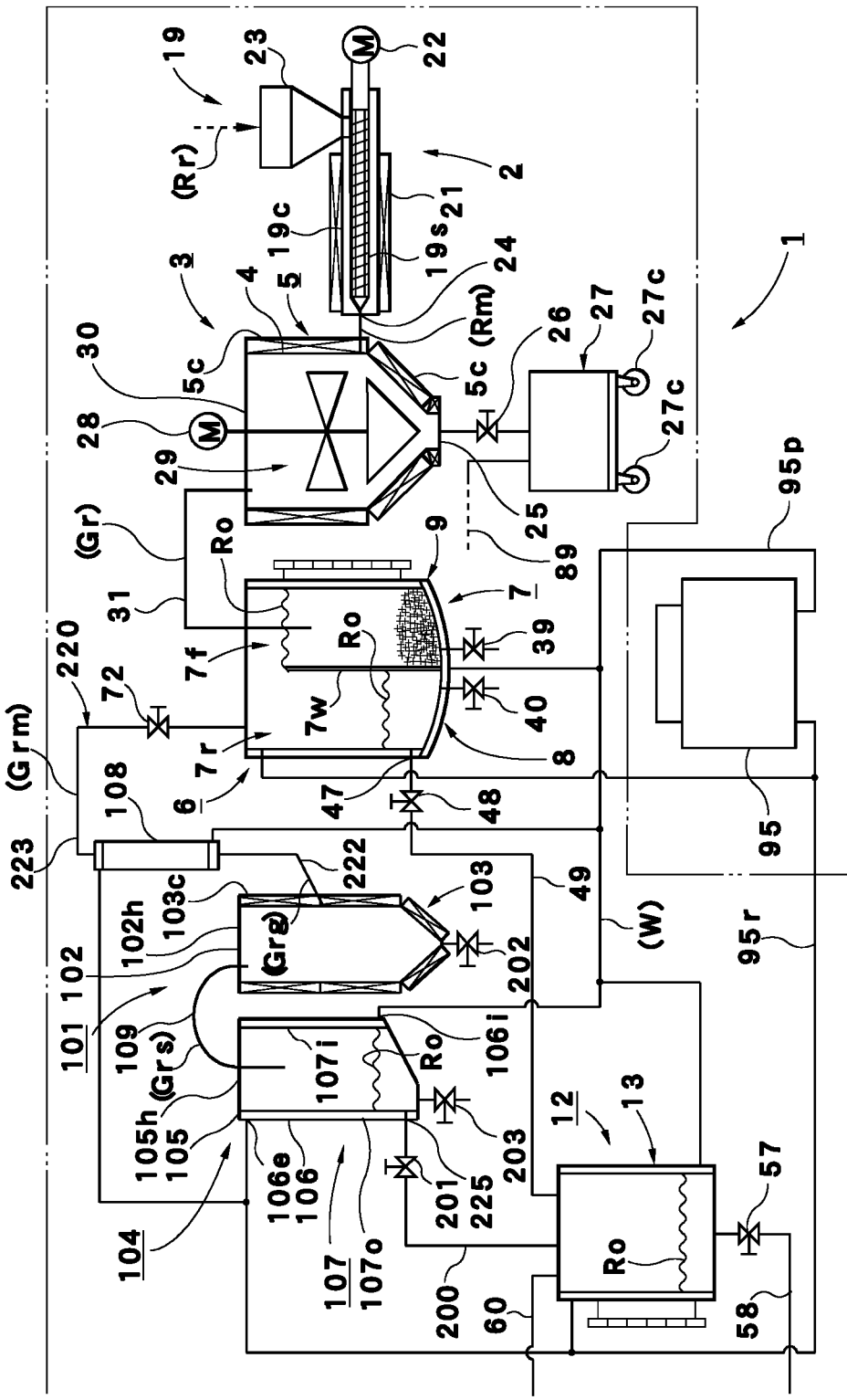
FIG. 2 is a schematic system diagram of an early stage of the oilification reduction system.

The preprocess unit 2 has the function of plasticizing waste plastic Rr to thereby supply it to the next process step, i.e., the pyrolysis process unit 3. As shown in FIG. 2, the preprocess unit 2 uses an extruder 19 that has a screw 19s built therein and configured to rotate inside a heating cylinder 19c. In this extruder 19, reference sign 21 indicates a heater unit for cylinder heating that is attached to an outer peripheral surface of the heating cylinder 19c for heating the cylinder, reference sign 22 indicates a motor for rotating the screw 19s, and reference sign 23 indicates a hopper that introduces waste plastic Rr into a rear interior of the heating cylinder 19c, respectively.

Thus, plasticized molten resin is extruded from a resin extrusion port 24 at a front end of the heating cylinder 19c and injected into the pyrolysis tank 4 mentioned later. Note that the waste plastic Rr to be introduced into the hopper 23 is prepared in advance as raw materials for recycling through a sorting step of separating and removing wastes and the like that cannot be recycled, a crushing step of crushing the waste plastics Rr, a washing step of washing the crushed waste plastic Rr, a drying step of drying it, and the like.

By using the extruder 19 as the preprocess unit 2 in this way, the waste plastic Rr can be plasticized in the process stage of the preprocess unit 2. Thus, this has advantages in that the next pyrolysis process in the main pyrolysis process unit 3, i.e., the pyrolysis process that produces decomposition gas Gr, can be performed more efficiently and effectively while it can contribute to ensuring good and stable quality of the recycled oil Ro.

As shown in FIG. 2, the main pyrolysis process unit 3 includes a main pyrolysis tank 4 in which plasticized waste plastic Rm from the above-mentioned preprocess unit 2 is housed, and a heating section 5 that heats this main pyrolysis tank 4. The main pyrolysis process unit 3 has the function of pyrolyzing the waste plastic Rm to generate decomposition gas Gr. As shown in FIGS. 1 and 2 as an example, the main pyrolysis tank 4 is integrally composed of iron, stainless steel, or the like such that it has a cylindrical shape that is gradually narrowed downward from its middle position between the upper and lower positions. The main pyrolysis tank 4 has a discharge hole 25 at the center of its bottom for discharging residual plastic to the outside. The discharge hole 25 communicates with the inside of a residue tank 27, which is hermetically sealed via an open/close valve 26. This residue tank 27 can be moved as desired by means of a plurality of casters 27c. Furthermore, covering an upper end opening of the main pyrolysis tank 4 with a lid 30 makes the main pyrolysis tank 4 hermetically sealed. Meanwhile, an upstream end port of a gas feed pipe 31, which delivers the internally produced decomposition gas Gr to the next process step, i.e., the main condensation process unit 6, is connected to and communicates with the lid 30 at a predetermined position.

A coil 5c, which constitutes the heating section 5, is arranged to be wound around the outer periphery of the main pyrolysis tank 4. Thus, by application of a high-frequency current to the coil 5c from a power supply unit (not shown), the main pyrolysis tank 4 is inductively heated, while the internal waste plastic Rm is heated and dissolved. As a result, the decomposition gas Gr due to pyrolysis can be produced. Thus, the main pyrolysis tank 4 can be inductively heated through the coil 5c by providing the main pyrolysis tank 4 with the coil 5c disposed around its outer periphery and also providing the heating section 5 that inductively heats the main pyrolysis tank 4 through application of the high-frequency current to the coil 5c. This configuration has advantages in that the heating section 5 in the main pyrolysis tank 4, which does not discharge carbon dioxide, can be constructed, and that it can contribute to making the entire pyrolysis process unit 3 smaller and more compact.

In addition, inside the main pyrolysis tank 4, a stirring mechanism 29 is disposed. The stirring mechanism 29 is rotated by a motor unit 28 to stir the waste plastic Rm therein. Various accessory mechanisms can be attached to the main pyrolysis tank 4 as needed. For example, a three-way valve (not shown) can be connected to the gas feed pipe 31 connected to the main pyrolysis tank 4 to selectively connect a gas reforming unit (not shown). The gas reforming unit has the function of decomposing a terephthalic acid, which is produced in a large amount when polyethylene terephthalate (PET) molded products such as PET bottles are pyrolyzed, that is, the function of converting a terephthalic acid into a low boiling point compound that does not crystallize by gas phase decomposition. When the PET molded product is introduced, it can be fed to the main condensation process unit 6 via the gas reforming unit. Further, a catalyst introducing mechanism (not shown) can also be connected so as to supply a catalyst such as zeolite, which promotes pyrolysis in the main pyrolysis tank 4, to the interior of the main pyrolysis tank 4.

Figure 5:
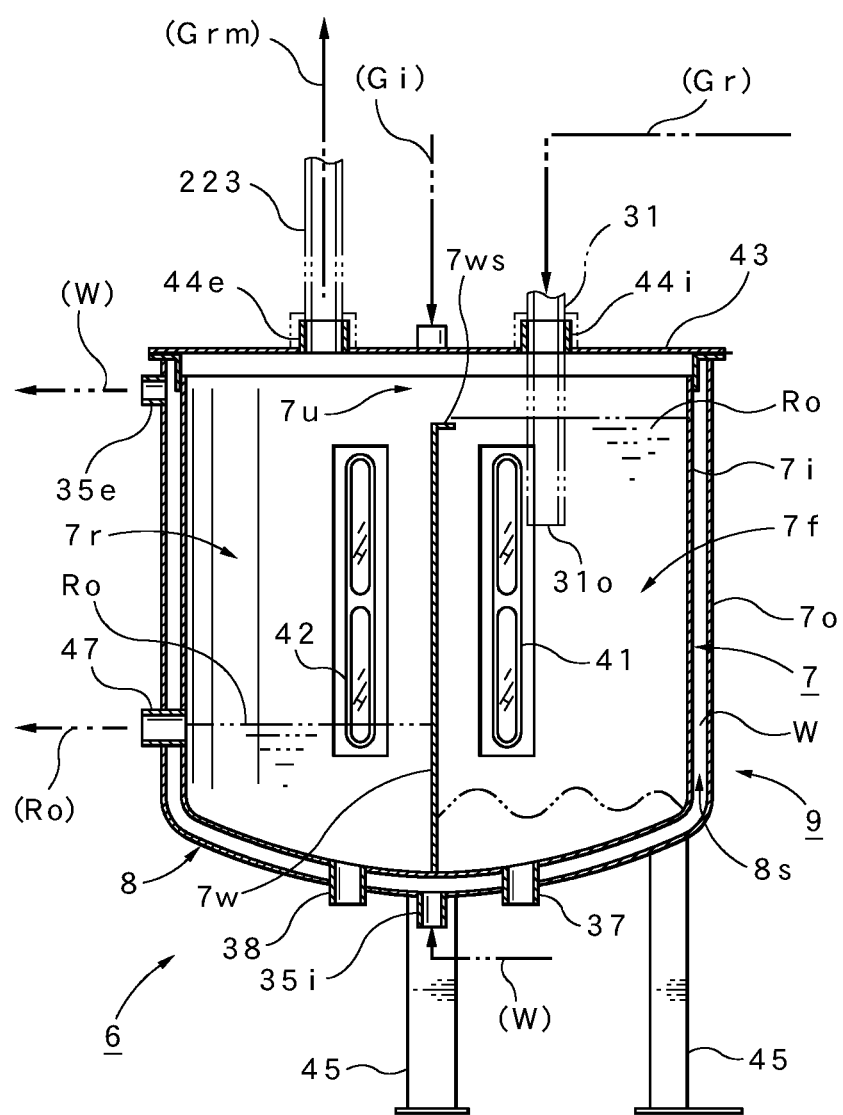
FIG. 5 is a cross-sectional side view showing an internal structure of a main condensation tank and a cooling section that constitute a main condensation process unit included in the oilification reduction system.

The main condensation process unit 6 includes the main condensing section 9. The main condensing section 9 is configured by including a main condensation tank 7 with a cooling section 8 attached as shown in FIG. 5. The main condensation tank 7 has a cylindrical inner tank portion 7i and outer tank portion 7o, each of which has a curved bottom made of heat-resistant material, and it has a double-layer structure with the outer tank portion 7o covering the entire outer side surface of the inner tank portion 7i. The entire shapes of the inner tank portion 7i and the outer tank portion 7o are formed to be approximately similar, with a predetermined interval (gap) being provided between the inner tank portion 7i and the outer tank portion 7o. Consequently, a water cooling space 8s where a circulating cooling water W is housed is formed between the inner tank portion 7i and the outer tank portion 7o. This water cooling space 8s constitutes the cooling section 8 that cools the inner tank portion 7i. In FIG. 5, reference sign 35i is an inlet for the cooling water W, provided at the center of the bottom of the outer tank portion 7o, while reference sign 35e is an outlet for the cooling water W, provided near the upper end of the outer tank portion 7o.

In this way, when configuring the main condensing section 9, the main condensation tank 7 is provided to have the double-layer structure with the outer tank portion 7o covering the outer side of the inner tank portion 7i via the predetermined interval, and the cooling section 8 is formed between the inner tank portion 7i and the outer tank portion 7o as the water cooling space 8s that houses the circulating cooling water W. Thus, this configuration has advantages in that it can contribute to having easy implementation and efficient cooling process because it can be realized with the relatively simple configuration while the entire main condensation tank 7 can be cooled evenly.

The interior of the inner tank portion 7i is provided with a partition wall 7w that partitions this inner tank portion 7i into front and rear parts. In this embodiment, a description will be given assuming that the upstream side of the flow of the process step is the front side, while the downstream side of the flow of the process step is the rear side. By providing the partition wall 7w, a front tank portion 7f and a rear tank portion 7r are formed inside the inner tank portion 7i. In this case, the partition wall 7w is formed such that its height is lower than an upper end position of the inner tank portion 7i. Thus, since an upper portion 7u of the partition wall 7w is open, while the front tank portion 7f and the rear tank portion 7r communicate with each other via an opening of the upper portion 7u, supernatant part of the recycled oil (equivalent to heavy oil A) Ro stored in the front tank portion 7f can flow over the partition wall 7w into the interior of the rear tank portion 7r.

In this way, when configuring the main condensation process unit 6, the main condensing section 9 is provided to have the main condensation tank 7 and the cooling section 8 that cools the main condensation tank 7, wherein the main condensation tank 7 has the front tank portion 7f and the rear tank portion 7r by providing therein the partition wall 7w with its upper portion 7u open and the decomposition gas Gr produced in the main pyrolysis process unit 3 is supplied to this front tank portion 7f, and produces recycled oil Ro by condensing the decomposition gas Gr supplied to the front tank portion 7f. With this configuration, since the partition wall 7w having the upper portion 7u open allows foreign matter to settle out as it is in the front tank portion 7f, the supernatant recycled oil Ro with no or little foreign matter can be obtained in the rear tank portion 7r. In addition, the basic shape of the condensation tank 7 becomes a simple tank structure, enabling easy and quick maintenance and cleaning or the like of the tank 7 for removal of foreign matter.

As shown in FIG. 5, the partition wall 7w desirably has a restriction piece 7ws formed at its upper end so as to be bent at a right angle toward the front tank portion 7f. The restriction piece 7ws can restrict foreign matter and prohibit it from entering the rear tank portion 7r, and also can enhance the strength (rigidity) at an upper end edge of the partition wall 7w. An exemplified partition wall 7w is shown to be disposed at the center of the inner tank portion 7i in the front-back direction as the disposing position, but this disposing position can be selected arbitrarily. For example, if it is placed closer to the front, the volume of the front tank portion 7f can be reduced while the volume of the rear tank portion 7r can be increased.

Thus, the upper end openings of the main condensation tank 7, i.e., the inner tank portion 7i and the outer tank portion 7o, are covered with a lid unit 43 to have the inner tank portion 7i and the water cooling space 8s hermetically sealed. The lid unit 43 located at the front tank portion 7f is provided with a gas inlet 44i shown in FIG. 5, and the gas inlet 44i is connected to a downstream end port of the gas feed pipe 31 shown in FIGS. 1 and 2. In this case, as shown in FIG. 5, it is desirable that the downstream end port of the gas feed pipe 31 is housed up to the interior of the inner tank portion 7i, and a lower end 310 of the feed pipe is located in its middle position in the up-down direction of the inner tank portion 7i.

Thus, since the decomposition gas Gr produced in the main pyrolysis tank 4 enters the interior of the front tank portion 7f through the gas feed pipe 31, the decomposition gas Gr is cooled in the front tank portion 7f and subjected to the condensation process to produce the recycled oil Ro. This recycled oil Ro overflows out of an upper end of the partition wall 7w and flows into the interior of the rear tank portion 7r, where it is stored temporarily. Meanwhile, the recycled oil Ro inside the rear tank portion 7r is discharged from an oil outlet 47 provided closer to the lower position and at the middle position in the up-down direction of the inner tank portion 7i.

In addition, in FIGS. 2 and 5, reference sign 37 indicates a drain port located at the bottom surface of the inner tank portion 7i in the front tank portion 7f, reference sign 38 indicates a drain port located at the bottom surface of the inner tank portion 7i in the rear tank portion 7r, and the respective drain ports 37 and 38 are connected to drain valves 39 and 40, respectively. Reference sign 41 indicates a viewing window for internal monitoring, provided at the peripheral surface of the front tank portion 7f, reference sign 42 indicates a viewing window for internal monitoring, provided at the peripheral surface of the rear tank portion 7r, and reference sign 45 indicates an installation leg fixed on the outer peripheral surface of the outer tank portion 7o.

Most of the decomposition gas Gr having entered the front tank portion 7f is cooled and subjected to a condensation process in the front tank portion 7f to become recycled oil Ro, while part of the decomposition gas (evaporation gas) Gr remains inside the main condensation tank 7. This remaining decomposition gas Gr is discharged through an auxiliary condenser or a discharge system in the case of a conventional oilification reduction device, but it still remains as undecomposed plastic inside the condensation tank or inside the discharge system including the auxiliary condenser at this time.

Therefore, in the present invention, the decomposition gas Gr remaining in the main condensation tank 7, that is, the residual gas component Grm in the main condensation tank 7 is reprocessed to generate recycled oil Ro from the residual gas component Grm, so that waste plastic Rr can be reduced to the recycled oil Ro without waste. Thus, a minor (internal) oilification reduction system for the residual gas component Grm is configured, so to speak, by providing the sub-pyrolysis process unit 101 and the sub-condensation process unit 104: the sub-pyrolysis process unit 101 produces the re-decomposition gas Grs by heating the residual gas component Grm remaining in the main condensation tank 7, whereas the sub-condensation process unit 104 produces the recycled oil Ro by condensing the re-decomposition gas Grs produced by the sub-pyrolysis process unit 101.

In this case, as shown in FIG. 2, the sub-pyrolysis process unit 101 includes a sub-pyrolysis tank 102 to which the residual gas component Grm remaining in the main condensation tank 7 of the main condensation process unit 6 is supplied, and a heating section 103 that heats the sub-pyrolysis tank 102. The sub-pyrolysis process unit 101 has the function of producing re-decomposition gas Grs by heating the residual gas component Grm. As shown in FIG. 2 as an example, the sub-pyrolysis tank 102 is integrally formed in a cylindrical shape using iron, stainless steel, or the like, and its upper end opening is covered with a lid unit 102h, making the sub-pyrolysis tank 102 hermetically sealed. A coil 103c, which constitutes the heating section 103, is arranged to be wound around the outer periphery of the sub-pyrolysis tank 102. Thus, by application of a high-frequency current to the coil 103c from a power supply unit (not shown), the sub-pyrolysis tank 102 is inductively heated.

In this way, when configuring the sub-pyrolysis process unit 101, the sub-pyrolysis tank 102 with the coil 103c disposed around its outer periphery is provided, and the heating section 103 is provided to inductively heat the sub-pyrolysis tank 102 by application of the high-frequency current to the coil 103c, whereby the sub-pyrolysis tank 102 can be inductively heated by the coil 103c. This configuration has advantages in that the heating section 103 in the sub-pyrolysis tank 102, which does not discharge carbon dioxide, can be constructed, and that it can contribute to making the entire sub-pyrolysis process unit 101 smaller and more compact. In addition, reference sign 202 indicates a drain valve provided at the center of the bottom of the sub-pyrolysis tank 102. Note that the sub-pyrolysis tank 102 basically heats and processes the residual gas component Grm, which eliminates the need for a stirring mechanism (29) or a residue tank (27) provided on the main pyrolysis tank 4 side.

Meanwhile, the interior of the sub-pyrolysis tank 102 and the interior of the main condensation tank 7 are connected by a gas delivery circuit 220. As shown in FIG. 1, the gas delivery circuit 220 includes a switching pipeline 221, and this switching pipeline 221 can switch between a first mode and a second mode. In the first mode, the residual gas component Grm inside the main condensation tank 7 is supplied directly to the interior of the sub-pyrolysis tank 102 as it is. In the second mode, the residual gas component Grm in the main condensation tank 7 is supplied to the sub-pyrolysis tank 102 through the pre-cooling section 108.

The switching between the first mode and the second mode can be performed depending on the type of waste plastic, etc. In particular, when the waste plastic is polyethylene (PE) resin, the optimum decomposition process can be performed by switching to the second mode. In this case, as in the first mode, when the residual gas component Grm inside the main condensation tank 7 is supplied directly to the interior of the sub-pyrolysis tank 102 as it is, the residual gas component Grm passes through the sub-pyrolysis tank 102 in the same state as it is and is then supplied to a sub-condensing section 107 mentioned later. Further, the residual gas component Grm can be gelatinized by pre-cooling through the pre-cooling section 108. It has been found that undecomposed plastic in gel form can be pyrolyzed again by heating. Thus, by passing the residual gas component through the pre-cooling section 108, it can be brought into the same state as the undecomposed plastic.

In this way, when configuring the sub-pyrolysis process unit 101, the pre-cooling section 108 is provided so that it gelatinizes the residual gas component Grm remaining in the main condensation tank 7 by cooling while supplying the residual gas component Grm to the sub-pyrolysis tank 102, whereby the gelatinized undecomposed plastic can be obtained. Thus, the sub-pyrolysis tank 102 to which the gelatinized undecomposed plastic is supplied can perform pyrolysis quickly, which can efficiently produce good re-decomposition gas Grs and further recycled oil Ro.

Figure 6:
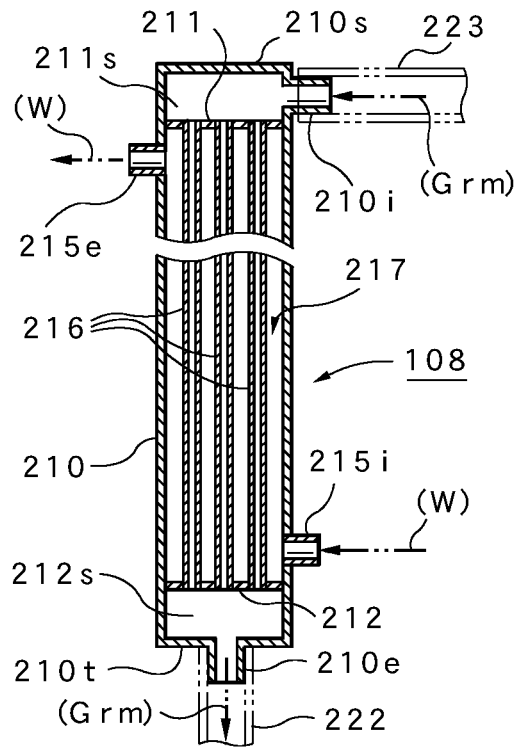
FIG. 6 is a cross-sectional side view showing an internal structure of a pre-cooling section included in a sub-pyrolysis process unit that is included in the oilification reduction system.

FIG. 6 shows an example of the configuration of the pre-cooling section 108. The exemplary pre-cooling section 108 includes a cylindrical outer shell case 210 with a hollow interior, and the outer shell case 210 is provided with a gas inlet 210i at the peripheral surface thereof on one end side of the outer shell case 210 and an gas outlet 210e at an end surface thereof on the other end side. In addition, an inlet side manifold 211s is provided inside one end surface 210s by mounting a closure plate 211 at a predetermined distance from the end surface 210s, while an outlet side manifold 212s is provided inside the other end surface 210t by mounting a closure plate 212 at a predetermined distance from the end surface 210t. A plurality of heat exchange pipes 216 are then bridged between the closure plates 211 and 212, and the inlet side manifold 211s and outlet side manifold 212s communicate with each other through the respective heat exchange pipes 216. Since the space between the closure plates 211 and 212 serves as the cooling section (heat exchange chamber) 217, the outer shell case 210 located on the closure plate 212 side is provided with an inlet 215i that allows cooling water W to flow into the cooling section 217, and the outer shell case 210 located on the closure plate 211 side is provided with an outlet 215e that allows cooling water W to flow out of the cooling section 217.

The gas inlet 210i of the pre-cooling section 108 is connected to a gas discharge port 44e in the main condensation tank 7 shown in FIG. 5 via a gas feed pipe 223, and the gas outlet 210e of the pre-cooling section 108 is connected to and communicates with the interior of the sub-pyrolysis tank 102 via a gas feed pipe 222 and further the switching pipeline 221 as shown in FIG. 1 (FIG. 2). Note that in FIG. 2, reference sign 72 indicates an opening/closing valve connected to the gas feed pipe 223.

Meanwhile, the sub-condensation process unit 104 includes a sub-condensing section 107 that has a sub-condensation tank 105 to which the re-decomposition gas Grs produced by the sub-pyrolysis process unit 101 is supplied and a cooling section 106 that cools the sub-condensation tank 105. The sub-condensing section 107 produces the recycled oil Ro by condensing the re-decomposition gas Grs.

The sub-condensing section 107 is formed of heat-resistant material in a cylindrical shape with a bottom. As shown in FIG. 2, the exemplary sub-condensing section 107 includes a cylindrical inner tank portion 107i and an outer tank portion 107o, and it has a double-layer structure with the outer tank portion 107o covering the entire outer side surface of the inner tank portion 107i. The entire shapes of the inner tank portion 107i and the outer tank portion 107o are formed to be approximately similar, with a predetermined interval (gap) being provided between the inner tank portion 107i and the outer tank portion 107o. Consequently, the cooling section 106 having a water cooling space where the circulating cooling water W is housed is formed between the inner tank portion 107i and the outer tank portion 107o. In FIG. 2, reference sign 106i is an inlet for the cooling water W, provided at the center of the bottom of the outer tank portion 107o, while reference sign 106e is an outlet for the cooling water W, provided near the upper end of the outer tank portion 107o.

Note that the sub-condensation tank 105 basically cools and processes the re-decomposition gas Grs that is obtained by heating the residual gas component Grm, which eliminates the need for a partition wall (7w) provided on the main condensation tank 7 side. Therefore, there are no front tank portion (7f) and rear tank portion (7r) inside the sub-condensation tank 105.

By covering the upper end opening of the sub-condensation tank 105 with the lid unit 105h, the sub-condensation tank 105 is hermetically sealed. The lid unit 105h of the sub-condensation tank 105 and the lid unit 102h of the sub-pyrolysis tank 102 are connected by the gas feed pipe 109, causing the interior of the sub-pyrolysis tank 102 to communicate with the interior of the sub-condensation tank 105 via the gas feed pipe 109. Reference sign 203 indicates a drain valve provided at the bottom surface of the sub-condensation tank 105.

Figure 7:
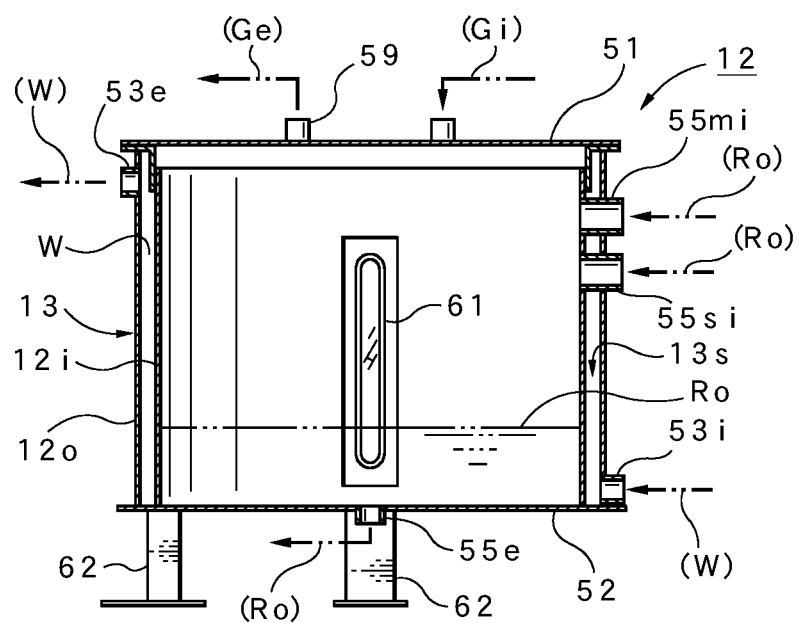
FIG. 7 is a cross-sectional side view showing an internal structure of a cooling tank and a cooling section that constitute a cooling process unit included in the oilification reduction system.

On the other hand, reference sign 12 indicates a cooling tank, and as shown in FIG. 7, the cooling tank includes an inner tank portion 12i and an outer tank portion 120, each of which is cylindrical and is made of heat-resistant material, and it has a double-layer structure with the outer tank portion 120 covering the entire outer side surface (peripheral surface) of the inner tank portion 12i. The entire shapes of the inner tank portion 12i and the outer tank portion 120 are formed to be approximately similar, with a predetermined interval (gap) being provided between the inner tank portion 12i and the outer tank portion 120. Consequently, a water cooling space 13s in which the circulating cooling water W is housed is formed between the inner tank portion 12i and the outer tank portion 120. This cooling space 13s serves as the cooling section 13 that cools the inner tank portion 12i. Thus, the upper end openings of the inner tank portion 12i and the outer tank portion 120 are covered with an upper lid unit 51, and the lower openings of the inner tank portion 12i and the outer tank portion 120 are covered with a lower lid unit 52, making the inner tank portion 12i and the water cooling space 13s hermetically sealed. The exemplary lower lid unit 52 is made of a single panel material, but if necessary, it may have a double-layer structure, as in the main condensation tank 7. In FIG. 7, reference sign 53i indicates an inlet of the cooling water W provided at the center of the bottom of the outer tank portion 120, and reference sign 53e indicates an outlet of the cooling water W provided near the upper end of the outer tank portion 120.

Figure 3:
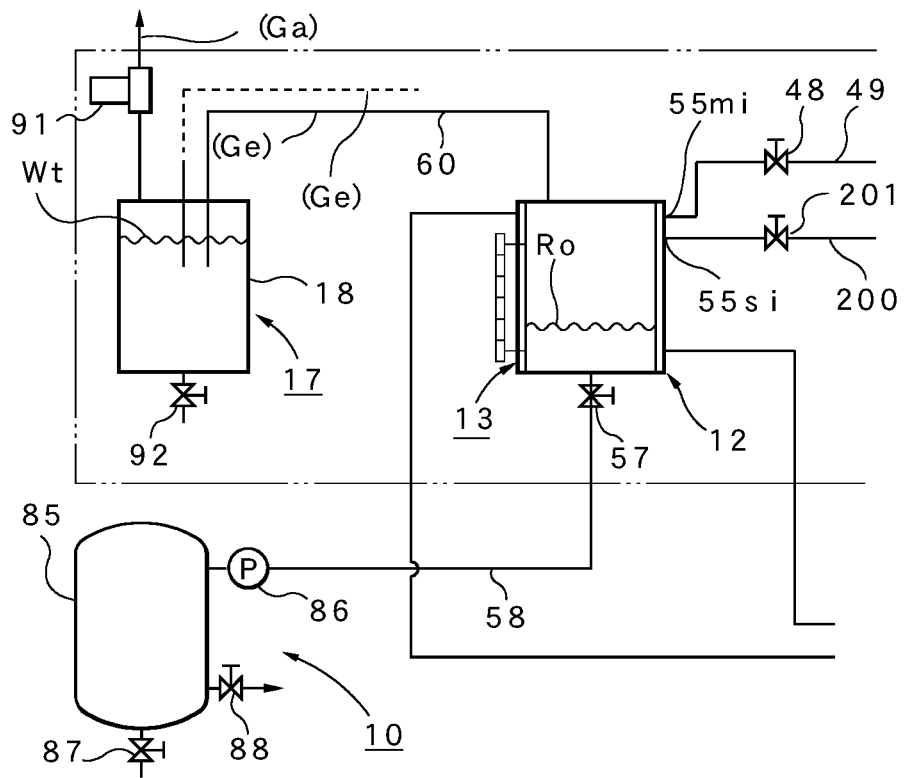
FIG. 3 is a schematic diagram of a late stage of the oilification reduction system.

As shown in FIGS. 2 and 3, an oil outlet 47 provided in the main condensation tank 7 is connected to an oil inlet 55mi of a cooling tank 12 via an oil feed pipe 49, and an oil outlet 225 provided in the sub-condensation tank 105 is connected to an oil inlet 55si of the cooling tank 12 via an oil feed pipe 200. Note that reference sign 48 indicates an opening/closing valve connected to the oil feed pipe 49, and reference numeral 201 indicates an opening/closing valve connected to the oil feed pipe 200.

In this way, the cooling process unit is provided to have the cooling tank 12 to which recycled oil Ro discharged from the main condensation tank 7 and the sub-condensation tank 105 is supplied and the cooling section 13 that is attached to the cooling tank 12 and cools the recycled oil Ro therein, whereby additional cooling can be performed for the recycled oil Ro from the rear tank portion 7r and the recycled oil Ro from the sub-condensation tank 105. Thus, this configuration has advantages in that, even when the recycled oil Ro from the rear tank portion 7r is not sufficiently cooled, the cooled recycled oil Ro can be supplied to the oil storage section 10, for example, by sufficiently and reliably performing a cooling process down to the desired room temperature. In this way, when configuring the cooling process unit, the cooling tank 12 is provided to have the double-layer structure with the outer tank portion 120 covering the outer side of the inner tank portion 12i via the predetermined interval, and the cooling section 13 is formed between the inner tank portion 12i and the outer tank portion 120 as the water cooling space 13s that houses the circulating cooling water W, whereby this can be realized with a relatively simple configuration, and the entire cooling tank 12 can be cooled evenly, which can contribute to having easy implementation and efficient cooling process.

As shown in FIGS. 3 and 7, a downstream end port of the oil feed pipe 49 shown in FIG. 2 described above is connected to an oil inlet 55mi provided near the upper end at the peripheral surface of the inner tank portion 12i. Further, a downstream end port of the oil feed pipe 200 shown in FIG. 2 described above is connected to an oil inlet 55si provided adjacent to the oil inlet 55mi.

At the center position of the lower lid unit 52 shown in FIG. 7, an oil outlet 55e from which the recycled oil Ro cooled inside the inner tank portion 12i flows out is provided. The recycled oil Ro flowing out of the oil outlet 55e is provided to the oil storage section 10 through an oil feed pipe 58 connected to the open/close valve 57. On the other hand, a gas discharge port 59 is provided at the upper lid unit 51. The residual gas Ge inside the cooling tank 12 is discharged from the gas discharge port 59, and supplied to a water sealed tank 18 mentioned later through the gas feed pipe 60 shown in FIG. 1. In FIG. 7, reference sign 61 indicates a viewing window for internal monitoring, provided at the peripheral surface of the cooling tank 12, and reference sign 62 indicates an installation leg fixed on the outer peripheral surface of the outer tank portion 120.

The oil storage section 10 has the function of storing the recycled oil Ro supplied from the cooling tank 12. The oil storage section 10 is equipped with an oil storage tank 85 and an oil feed pump 86 connected to the oil storage tank 85. The oil feed pipe 58 connected to the cooling tank 12 is connected to the oil storage tank 85 via the oil feed pump 86. Note that in FIG. 3, reference sign 87 indicates a drain valve connected to the bottom of the oil storage tank 85, and reference sign 88 indicates an opening/closing valve connected to a lower portion of the oil storage tank 85. In this case, part of the recycled oil Ro is supplied through the opening/closing valve 88 to fuel equipment such as boilers or generators that can use recycled oil Ro as fuel.

Meanwhile, reference sign 17 shown in FIG. 3 indicates an off-gas process unit, and includes a water sealed tank 18 in which processed water Wt is housed, and an exhaust blower 91 that discharges purified gas Ga inside the water sealed tank 18 to the outside (atmosphere). The water sealed tank 18 has its whole hermetically sealed and houses a predetermined amount of processed water (tap water) Wt inside. The downstream end port of a gas feed pipe 60 connected to the aforementioned cooling tank 12 is immersed in the processed water Wt, and a downstream end port of the gas feed pipe 89 connected to the aforementioned residue tank 27 is immersed in the processed water Wt. Note that in FIG. 3, reference sign 92 indicates a drain valve connected to the bottom surface of the water sealed tank 18.

By providing such an off-gas process unit 17, a harmful or useless material component of the residual gas Ge inside the cooling tank 12 and residue tank 27 can be absorbed in the processed water Wt, so that the cleaned gas can be released into the atmosphere.

Furthermore, in FIG. 1, reference sign 95 is a cooling tower (water cooling system) that supplies cooling water W.

The cooling water supply port of the cooling tower 95 is connected to an inlet 35*i* of the cooling section 8, an inlet 106*i* of the cooling section 106, an inlet 53*i* of the cooling section 13, and an inlet 215*i* of the cooling section 217 which are attached to the above-mentioned main condensation tank 7, respectively, through a supply water path 95*p*. The aforementioned outlet 35*e* of the cooling section 8, the outlet 106*e* of the cooling section 106, the outlet 53*e* of the cooling section 13, and the outlet 215*e* of the cooling section 217 are connected to a cooling water return port of the cooling tower 95 via a return channel 95*r*. In such a circulation system, the cooling water W cooled by the cooling tower 95 is supplied to the cooling section 8, the cooling section 13, the cooling section 106, and the cooling section 217, respectively, via the supply water path 95*p*, whereby the cooling water W cools and processes the main condensation tank 7, the sub-condensation tank 105, the cooling tank 12, and the pre-cooling section 108. The cooling water W warmed by heat exchange is returned to the cooling tower 95 via the return channel 95*r* and cooled again, which then constitutes a circulation system for the cooling water W to be supplied to the supply water path 95*p*.

Figure 4:
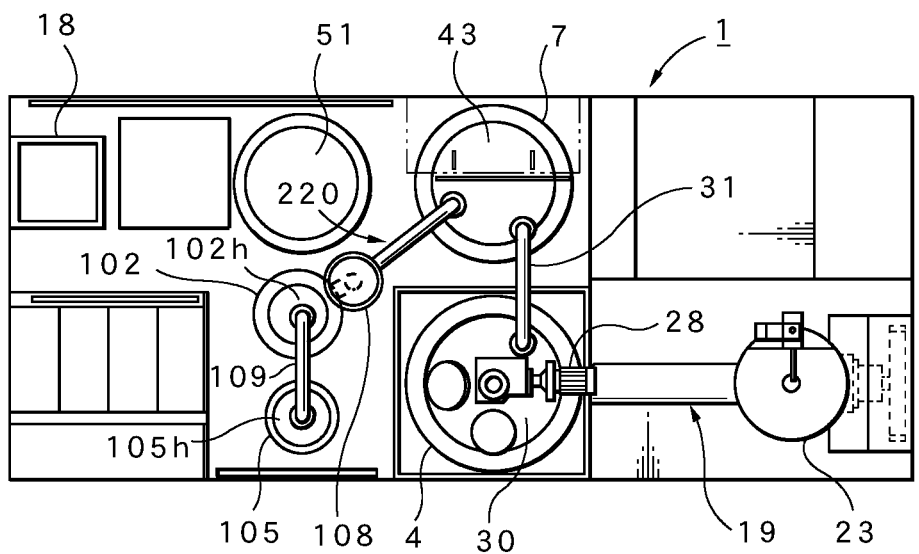
FIG. 4 is an exterior plan view of the entire oilification reduction system.

In FIG. 1, reference sign 96 is a nitrogen gas supply unit, and nitrogen gas (or generally inert gas) Gi from the nitrogen gas supply unit 96 is supplied to an internal space of the main pyrolysis tank 4, an internal space of the residue tank 27, an internal space of the main condensation tank 7, and an internal space of the sub-pyrolysis tank 102, an internal space of the sub-condensation tank 105, and an internal space of the cooling tank 12, respectively, via a gas pipe 97. Thus, these internal spaces can avoid directly contacting the air. The exterior configuration (plane configuration) of the entire oilification reduction system 1 is shown in FIG. 4.

Figure 8:
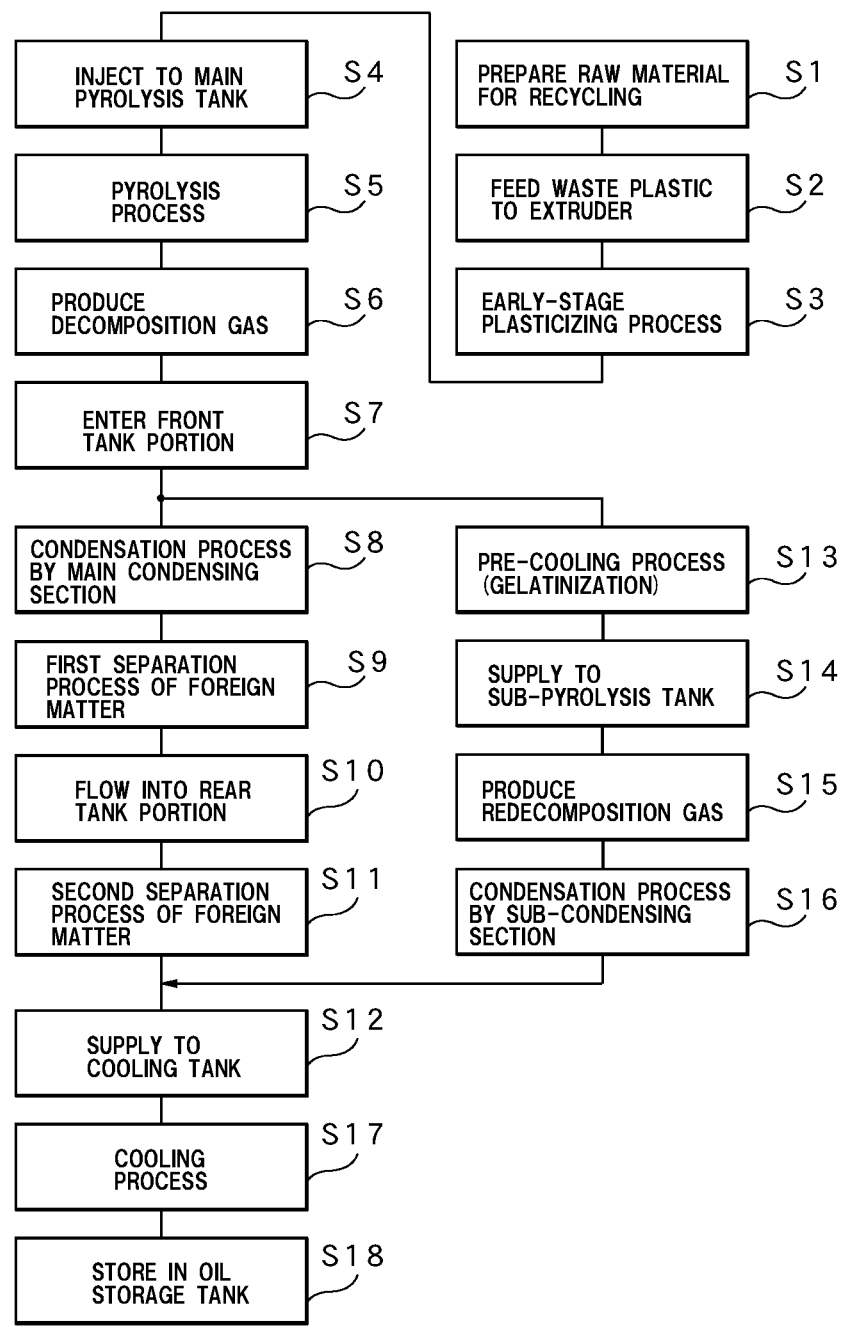
FIG. 8 is a process diagram showing a flowchart for explaining the processes and operation of the oilification reduction system.

Next, the entire operation of the oilification reduction system 1 according to this embodiment will be described according to the process step diagram shown in FIG. 8 while referring to FIGS. 1 to 7.

A description will be given on the exemplary operation in the above-mentioned second mode, i.e., the case where the pre-cooling section 108 is used. First, waste plastic Rr is prepared as raw material for recycling by sorting reusable waste plastic Rr in advance to remove non-reusable waste plastic or foreign matter (metals, etc.) that have been mixed in, crushing the reusable waste plastic Rr into chips of a predetermined size or smaller, and subjecting these crushed chips to a washing step and a drying step (step S1).

Then, the waste plastic Rr serving as the raw materials for recycling is introduced into the hopper 23 of the extruder 19 (step S2). The waste plastic Rr introduced into the hopper 23 is subjected to an early-stage plasticizing process by the extruder 19 (step S3). That is, the extruder 19 performs the plasticizing process on the waste plastic Rr by the rotation of the screw 19*s* and the heating of the heater unit 21. Thus, the plasticized molten waste plastic Rm is extruded from a resin extrusion port 24 at the front end of the heating cylinder 19*c* and injected into the main pyrolysis tank 4 (step S4).

The main pyrolysis tank 4 is inductively heated by a high-frequency current applied to the coil 5*c*. In this case, the main pyrolysis tank 4 is heated to about 450 to 500[° C.], which is necessary for pyrolysis of waste plastic Rm. The main pyrolysis tank 4 is usually heated to about 200 [C] during standby, but when heating waste plastic Rm, the heating temperature can be set arbitrarily depending on the kind of waste plastic Rm (Rr) to be processed. Consequently, in the main pyrolysis tank 4, the waste plastic Rm housed therein is dissolved and subjected to a pyrolysis process at a high temperature of about 450 to 500[° C.] (step S5). At this time, the dissolved waste plastic Rm is subjected to a stirring process with the stirring mechanism 29.

Decomposition gas Gr is produced from the waste plastic Rm in the main pyrolysis tank 4 through the pyrolysis process (step S6). The decomposition gas Gr in the main pyrolysis tank 4 passes through the gas feed pipe 31 and enters the interior of the front tank portion 7*f* in the main condensation tank 7 (step S7). Since the entire main condensation tank 7 is cooled by the cooling section 8, the decomposition gas Gr having entered the front tank portion 7*f* is subjected to a cooling process by the cooling section 8. That is, the decomposition gas Gr is subjected to a condensing process by the main condensing section 9 (step S8). Thus, recycled oil (equivalent to heavy oil A) Ro is stored in the front tank portion 7*f*, and foreign matter is subjected to a first separation process of foreign matter that settles out at the bottom of the front tank portion 7*f* (step S9).

When the liquid level of the recycled oil Ro stored in the front tank portion 7*f* reaches the upper end position of the partition wall 7*w*, the supernatant part of the recycled oil Ro flows into the rear tank portion 7*r* (step S10). The recycled oil Ro having flowed into the rear tank portion 7*r* is stored in the rear tank portion 7*r*. When the liquid level of the recycled oil Ro stored reaches the oil outlet 47, the supernatant part of the recycled oil Ro flows out of the oil outlet 47. That is, a second separation process of foreign matter is performed, and the recycled oil is supplied to the next stage, i.e., the cooling tank 12 (steps S11 and S12).

On the other hand, when the decomposition gas Gr enters the interior of the aforementioned front tank portion 7*f*, the cooling action of the cooling section 8 is performed, that is, the condensing process produces the recycled oil Ro, while the decomposition gas Gr spreads out into the interior of the main condensation tank 7. The spread decomposition gas Gr is discharged from the gas discharge port 44*e* as a so-called residual gas component Grm. The discharged residual gas component Grm passes through the pre-cooling section 108, and subjected to a pre-cooling process by the pre-cooling section 108, whereby the residual gas component Grm is gelatinized (step S13).

The residual gas component Grg, which has been gelatinized by the pre-cooling section 108, is supplied to the sub-pyrolysis tank 102 through the gas feed pipe 222 (step S14). Thus, the degree of the gel state (viscous state) can be set by adjusting the cooling temperature of the pre-cooling section 108. If the viscosity is large, the pre-cooling section 108 may become clogged. For this reason, the degree of the gel state is set to ensure that the gelatinized material is supplied to the sub-pyrolysis tank 102 even if it is in a gel state.

The residual gas component Grm in the gel state, supplied to the sub-pyrolysis tank 102, is subjected to a pyrolysis process by the heated sub-pyrolysis tank 102, thus producing re-decomposition gas Grs inside the sub-pyrolysis tank 102 (step S15). The heating temperature of the sub-pyrolysis tank 102 is set to about 450 to 500[° C.], which is similar to that of the main pyrolysis tank 4. Furthermore, the re-decomposition gas Grs in the sub-pyrolysis tank 102 is supplied through the gas feed pipe 109 to the interior of the sub-condensation tank 105, where the cooling action of the cooling section 106, that is, the condensation process for the re-decomposition gas Grs is performed by the sub-condensing section 107 (step S16). Consequently, as recycled oil (equivalent to heavy oil A) Ro is stored inside the sub-condensing section 107, this recycled oil Ro flows out of the oil outlet 225 and is supplied to the next stage, i.e., the cooling tank 12 via the oil feed pipe 200 (step S12).

Since the cooling section 13 is attached to the cooling tank 12, a mixture of the recycled oil Ro from the main condensing section 9 and the recycled oil Ro from the sub-condensing section 107, which have flowed into the cooling tank 12, is subjected to a cooling process by the cooling section 13 (step S17). In this case, the recycled oil Ro flowing out of each of the condensing sections 9 and 107 is in a high temperature state of about 200 [C] and is not sufficiently cooled. Because of this, it is cooled down to a temperature near room temperature by the cooling tank 12. The cooled recycled oil Ro is then stored in the oil storage tank 85 by the oil feed pump 86 (step S18).

In an off-gas process unit 17, off-gas treatment is performed to detoxify and release into the atmosphere the off-gas produced in each process of sequentially processing waste plastic Rm, namely, residual gas (off-gas) Ge produced in the cooling tank 12 and the residue tank 27. In this case, the residual gas Ge is supplied to the processed water Wt housed in the water sealed tank 18, so that the harmful components or the like of the residual gas Ge are absorbed by the processed water Wt. Purification gas Ga that floats from the processed water Wt in the water sealed tank 18 is discharged into the atmosphere by the exhaust blower 91.

Therefore, such a waste plastic oilification reduction system 1 according to this embodiment basically includes: the preprocess unit 2, the main pyrolysis process unit 3, the main condensation process unit 6, the sub-pyrolysis process unit 101, the sub-condensation process unit 104, and the oil storage section 10. The preprocess unit 2 plasticizes the waste plastic Rr and discharges the plasticized waste plastic Rr therefrom. The main pyrolysis process unit 3 has the main pyrolysis tank 4 in which the plasticized waste plastic Rm from the preprocess unit 2 is housed, and the heating section 5 that heats the main pyrolysis tank 4. The main pyrolysis process unit 3 pyrolyzes the waste plastic Rm to produce the decomposition gas Gr. The main condensation process unit 6 includes the main condensing section 9 that has the main condensation tank 7 to which the decomposition gas Gr produced in the main pyrolysis process unit 3 is supplied, and the cooling section 8 that cools the main condensation tank 7. The main condensing section 9 condenses the decomposition gas Gr to produce the recycled oil Ro. The sub-pyrolysis process unit 101 has the sub-pyrolysis tank 102 to which the residual gas component Grm remaining in the main condensation tank 7 is supplied and the heating section 103 that heats the sub-pyrolysis tank 102. The sub-pyrolysis process unit 101 heats the residual gas component Grm to produce the re-decomposition gas Grs. The sub-condensation process unit 104 includes the sub-condensing section 107 that has the sub-condensation tank 105 to which the re-decomposition gas Grs produced in the sub-pyrolysis process unit 101 is supplied, and the cooling section 106 that cools the sub-condensation tank 105. The sub-condensing section 107 condenses the re-decomposition gas Grs to produce the recycled oil Ro. The oil storage section 10 stores the recycled oil Ro supplied from the main condensing section 9 and the recycled oil Ro supplied from the sub-condensing section 107. With this configuration, the remaining residual gas component Grm can be effectively reused as the recycled oil Ro. This can further enhance the recycling efficiency when performing oilification reduction, achieving an increase in the produced amount of the recycled oil Ro and a reduction of the amount of re-wastes, while reducing the labor and time required for maintenance and cleaning, and also improving the adverse effects that tend to cause malfunctions and troubles.

Although the best embodiments have been described in detail above, the present invention is not limited to such embodiments, but any changes, addition, or deletion may be made to these embodiments in terms of detailed configuration, shape, material, quantity, numerical values, etc., without departing from the gist of the present invention.

For example, the sub-pyrolysis process unit 101 is desirably provided with the pre-cooling section 108 that gelatinizes the residual gas component Grm by cooling when the residual gas component Grm remaining in the main condensation tank 7 is supplied to the sub-pyrolysis tank 102, but this pre-cooling section 108 is not an essential component. As shown in the examples, depending on the kind of waste plastic, the present invention does not exclude a case where the residual gas component Grm remaining in the main condensation tank 7 is fed directly to the sub-pyrolysis tank 102 without passing through the pre-cooling section 108. Meanwhile, the case in which the extruder 19 having the rotary screw 19s built into the heating cylinder 19c is used as the preprocess unit 2 has been described as an example, but this is not an essential component. The above description has been given on the case of providing the respective pyrolysis tanks 4 and 102 with the coils 5c and 103c around their outer periphery, and also providing the heating sections 5 and 103 that inductively heat the respective pyrolysis tanks 4 and 102 by application of a high-frequency current to the coils 5c and 103c when configuring the respective pyrolysis process units 3 and 103. However, the present invention does not exclude any heating section based on other heating systems. Meanwhile, the above description has also been given on the case in which when configuring the main condensing section 9, it includes the main condensation tank 7 having the double-layer structure with the outer tank portion 7o covering the outer side of the inner tank portion 7i via the predetermined interval, and the cooling section 8 formed between the inner tank portion 7i and the outer tank portion 7o as the water cooling space 8s that houses the circulating cooling water W. However, the present invention does not exclude other configurations regarding the condensing section. Therefore, the double-layer structure may be configured such that the outer tank portion 7o may cover the entire or part of the outer side of the inner tank portion 7i. Alternatively, the double-layer structure is not essential and a cooling section 8 with another configuration may be attached. Similarly, the above description has also been given on the case in which when configuring the sub-condensing section 107, it includes the sub-condensation tank 105 having the double-layer structure with the outer tank portion 107o covering the outer side of the inner tank portion 107i via the predetermined interval, and the cooling section 106 formed between the inner tank portion 107i and the outer tank portion 107o as the water cooling space that houses the circulating cooling water W. However, the present invention does not exclude other configurations regarding the sub-condensing section. Therefore, the double-layer structure may be configured such that the outer tank portion 107o may cover the entire or part of the outer side of the inner tank portion 107i. Alternatively, the double-layer structure is not essential and a cooling section 106 with another configuration may be attached.

INDUSTRIAL APPLICABILITY

The waste plastic oilification reduction system according to the present invention can be used to recycle various types of waste plastics (polymeric wastes), such as plastic products, by reducing them to recycled oil equivalent to heavy oil A.

The invention claimed is:

1. A waste plastic oilification reduction system that produces recycled oil by pyrolyzing waste plastic through heating and condensing produced decomposition gas, the system comprising:
    a preprocess unit that plasticizes and discharges the waste plastic;
    a main pyrolysis process unit having a main pyrolysis tank in which the plasticized waste plastic from the preprocess unit is housed and a heating section that heats the main pyrolysis tank, and being configured to pyrolyze the waste plastic to produce decomposition gas;
    a main condensation process unit including a main condensing section that has a main condensation tank to which the decomposition gas in the main pyrolysis process unit is supplied and a cooling section that cools the main condensation tank, and is configured to condense the decomposition gas to produce recycled oil;
    a sub-pyrolysis process unit having a sub-pyrolysis tank to which a residual gas component remaining in the main condensation tank is supplied and a heating section that heat the sub-pyrolysis tank, and being configured to heat the residual gas component to produce re-decomposition gas;
    a sub-condensation process unit including a sub-condensing section that has a sub-condensation tank to which the re-decomposition gas produced by the sub-pyrolysis process unit is supplied and a cooling section that cools the sub-condensation tank, and is configured to condense the re-decomposition gas to produce recycled oil;
    and an oil storage section that stores the recycled oil supplied from the main condensing section and the recycled oil supplied from the sub-condensing section.

2. The waste plastic oilification reduction system according to claim 1, wherein the main condensation process unit includes a main condensing section having a main condensation tank and a cooling section that cools the main condensation tank, wherein the main condensation tank has a front tank portion and a rear tank portion formed by providing therein a partition wall with an upper portion thereof open, the decomposition gas produced in the main pyrolysis process unit is supplied to the front tank portion, and the main condensation section is configured to condense the decomposition gas supplied to the front tank portion to produce recycled oil.

3. The waste plastic oilification reduction system according to claim 1, wherein the preprocess unit uses an extruder that has a screw built thereinto to rotate inside a heating cylinder.

4. The waste plastic oilification reduction system according to claim 1, wherein the main pyrolysis process unit includes: a main pyrolysis tank with a coil disposed around an outer periphery thereof and also a heating section that inductively heats the main pyrolysis tank by application of a high-frequency current to the coil.

5. The waste plastic oilification reduction system according to claim 1, wherein the sub-pyrolysis process unit includes a pre-cooling section that gelatinizes the residual gas component by cooling when the residual gas component remaining in the main condensation tank is supplied to the sub-pyrolysis tank.

6. The waste plastic oilification reduction system according to claim 1, wherein the sub-pyrolysis process unit includes a sub-pyrolysis tank with a coil disposed around an outer periphery thereof and also a heating section that inductively heats the sub-pyrolysis tank by application of a high-frequency current to the coil.

* * * * *